United States Patent Office 3,770,778
Patented Nov. 6, 1973

---

3,770,778
1,2-AZIDONITRATES AND METHOD OF PRODUCING SAME
Walter Trahanovsky, Ames, Iowa, and M. Dwight Robbins, Fairfield, Ohio, assignors to Iowa State University Research Foundation, Inc., Ames, Iowa
No Drawing. Filed May 17, 1972, Ser. No. 253,969
Int. Cl. C07d 109/00
U.S. Cl. 260—349
4 Claims

ABSTRACT OF THE DISCLOSURE 1,2-azidonitrates are produced by reacting an appropriate olefinic compound with an ionic azide and ceric ammonium nitrate; the compounds so produced are useful as intermediates in synthesizing the corresponding 1,2-aminohydroxy compounds and derivatives thereof which are physiologically active.

BACKGROUND AND SUMMARY

The present invention is concerned with novel 1,2-azidonitrates and a method of producing them. It has been discovered that such compounds of the general formula

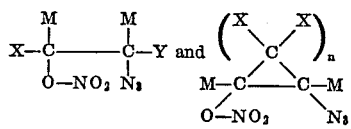

can be produced by addition across specific types of olefinic double bonds. Such a method comprising reacting an appropriate olefin with an ionic azide and ceric ammonium nitrate. That is, olefins of the general formula (1)
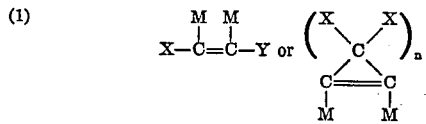

are reacted under room conditions (or at slightly elevated temperatures to increase yields) in an appropriate solvent with an ionic azide of the formula (2) $\quad Z^t(N_3)_t$ and ceric ammonium nitrate (CAN) of the formula (3) $\quad (NH_4)_2{}^{++}[Ce(NO_3)_6{}^=]$ according to the following reactions, depending upon the starting olefin used:

(4)

(5)

It is well known that the oxidation of sodium azide by CAN in a suitable solvent at normal conditions yields quantitatively stoichiometric amounts of nitrogen. However, upon adding the olefins defined herein to this reaction, a suppression or often an almost complete cessation of gas evolution occurred. This reaction was completed under normal conditions as soon as the addition was made. Acetonitrile or partially aqueous acetonitrile were the solvents employed. The products were isolated by flooding the reaction mixture with water and extracting with pentane. Further purification was obtained as needed by thin-layer chromatography and the end products isolated had azide and nitrate functional groups as inferred from their IR spectra. The structures were further verified by way of NMR and mass spectra to positively identify them as 1,2-azidonitrates.

Referring now to the olefins and azides defined by the formulae of (1) and (2), as used throughout the specifications and claims the arbitrary symbols X, Y, M, Z, n and t represent the following:

Each X, taken separately, independently represents a hydrogen atom, (hereafter referred to as H), a primary, secondary or tertiary alkyl group containing from 1 to 10 carbon atoms, inclusive, or a substituted or unsubstituted aryl group. For example, this would include methyl, n-propyl, n-butyl, n-heptyl, n-decyl, isopropyl, 3,3-dimethylheptyl, 2,3-dimethylpentyl, isohexyl, t-butyl, t-pentyl, 1,1-dimethylheptyl, 2-methyl-2-ethylpentyl and 2-methyl-β-isopropylheptyl. The aryls correspond to the general formula:

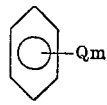

wherein m is from 1 to 5, inclusive, and each Q, taken separately, independently represents chlorine, bromine, fluorine or an alkyl group of 1 to 4 carbon atoms in primary, secondary or tertiary form. This would include o-chlorophenyl, m-bromophenyl, p-fluorophenyl, 1-methyl-2-bromo-3-chlorophenyl 2-ethylphenyl, 2-isopropylphenyl and 3-tert-butylphenyl.

In preferred embodiments however, each X, taken separately, independently represents H, a primary, secondary or tertiary alkyl group containing from 1 to 5 carbon atoms, inclusive, or phenyl.

In a similar fashion each Y represents an identical series (as outlined above) of primary, secondary or tertiary alkyl substituents or substituted or unsubstituted aryl groups. It will be noted that Y as defined does not include H, a hydrogen atom. In a similar fashion, however, preferred forms are those wherein each Y, taken separately, independently represents a primary, secondary or tertiary alkyl of 1 to 5 carbon atoms, inclusive, or phenyl.

Referring now to the substituent groups labeled M, each taken separately and independently represents H or a primary, secondary or tertiary alkyl of 1 to 10 carbon atoms, inclusive, as defined above for X; it does not include any aryl groups. The preferred forms include H, or a primary, secondary or tertiary alkyl of 1 to 5 carbon atoms, inclusive.

The cyclic olefins and their end products are further defined by the lower case n which denotes the number of substituted or unsubstituted carbon atoms in the ring. In general, n is an integer that can vary from 3 to 10, inclusive, with the preferred embodiments having a value of from 3 to 6, inclusive.

Turning now to the formula of (2), Z represents an ionic cation selected from the group consisting of Na+, K+, Li+, Be+2, Mg+2, Ca+2, Ce+3 and (R)₄N+, wherein each R, taken separately, represents a primary alkyl group of 1 to 4 carbon atoms, inclusive, such as, for example, methyl, propyl or butyl. In practice, however, the use of the alkali and alkaline earth cations is preferred, with a normal valence of 1 or 2. The lower case t represents the valence of the ionic cation selected, and in general can vary from 1 to 3, inclusive.

In accordance with the above definitions, representative 1,2-azidonitrates would include:

2-azido-1-(m-chlorophenyl)-1-nitratopropane;
2-azido-3-nitrato-3-(o-bromophenyl)-tridecane;
1-azido-2-nitrato-2-(p-fluorophenyl)-dodecane;
3-azido-5-methyl-2-nitrato-2-(p-t-butylphenyl)-hexane;
6-azido-2,2-dimethyl-7-nitrato-7-(p-methylphenyl)-tridecane;
1-azido-1,2-di(m-isopropylphenyl)-2-nitratoethane;
1-azido-1,2-diisopropyl-2-nitratocyclopentane;
2-azido-1,4-didecyl-3-nitratocyclohexane;
1-azido-4,5-diisopropyl-2-nitratocyclohexane;
1-azido-5-neopentyl-2-nitratocycloheptane;
1-azido-2-nitratocyclodecane;
1-azido-2-nitratocyclododecane;
2-azido-1-nitrato-1-t-butylcyclohexane;
2-azido-1-decyl-1-nitratocyclohexane;
1-azido-2-nitrato-4-phenylcyclopentane;
2-azido-1,4-di(m-chlorophenyl)-3-nitratocyclohexane;
1-azido-4,5-di(o-bromophenyl)-2-nitratocyclohexane;
2-azido-1,4-di(p-fluorophenyl)-3-nitratocyclohexane;
1-azido-4-(m-methylphenyl)-2-nitratocyclopentane;
2-azido-1,4-di-(m-isopropylphenyl)-3-nitratocyclopentane;
2-azido-1,4-di-(m-butylphenyl)-3-nitratocyclopentane;
2-azido-1,4-di(m-t-butylphenyl)-3-nitratocyclohexane;

In addition to the species defined above, it has also been determined that other olefins react in a similar fashion. Among these are norborene, α-pinene, indene, 1,3,5-cycloheptatriene and dienes such as 1,4-diphenylbutadiene and 2,4-dimethylbutadiene. It is believed that multiple double bonds react successively to produce multiple independent azidonitrato additions as outlined previously.

The compounds of the present invention are useful as intermediates in the production of α-amino-β-hydroxy compounds which are physiologically active or have other commercial uses. Specifically, the 1,2-azidonitrates are reduced according to the general formula:

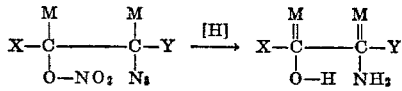

For example, 1-azido-2-nitrato-2-phenylethone prepared according to this invention can be reduced by iron in acetic acid to produce α-(aminomethyl)benzyl alcohol (phenylethanolamine). The hydrogen sulfate salt of this amino-alcohol is used during polymerization reactions and topically as a vasoconstrictor.

The prior art discloses only one instance of the synthesis of 1,2-azidonitrates. In Chemical Abstracts 30:3649[5], the azido nitrato ethane compound was shown, being produced by a nitration of the corresponding alcohol. This compound is believed to be unstable as are the diazo and dinitrato analogs of the compounds of the instant invention. As will be shown, the 1,2-azidonitrates herein disclosed are stable under normal conditions.

DETAILED DESCRIPTION

The following examples are provided by way of illustration only and are not meant to in any way limit the scope of the present invention.

EXAMPLE I 1-azido-2-nitratocyclohexane

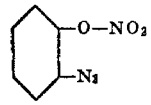

2 grams (g.) of CAN dissolved in 10 milliliters (ml.) acetonitrile was added slowly and dropwise to a solution consisting of 300 milligrams (mg.) of sodium azide and 500 mg. of cyclohxene in 10 ml. acetonitrile. The latter compound was obtained from the Aldrich Chemical Company and used without further purification. The yellow color of the CAN solution disappeared and no gas was evolved. The mixture was poured into 50 ml. of water and extracted with 50 and 25 ml. of pentane. After drying in the presence of MgSO$_4$ the solvent was removed on a rotary evaporator to yield a pale yellow residue. Spectral analysis confirmed the structure given above.

EXAMPLE II 1-azido-2-nitrato-2-phenylethane

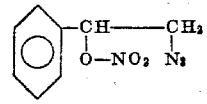

5.3 g. of CAN in 10 ml. acetonitrile was added to 500 mg. of styrene and 350 mg. sodium azide in 10 ml. acetonitrile. As in Example I, the styrene was commercially obtained from the Aldrich Chemical Company. Approximately 10 ml. of gas was evolved. The mixture was poured into 50 ml. of pentane. After drying, the pentane was removed as in Example I. The residue was thereafter purified by way of thin layer chromatography (silica gel with pentane); it showed the presence of 1-azido-2-nitrato-2-phenylethane upon analysis.

EXAMPLE III 1-azido-2-nitratohexane

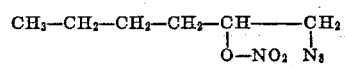

7.0 g. CAN in 10 ml. acetonitrile was added dropwise to a solution of 0.4 g. 1-hexene (purchased from the Columbia Chemical Company) and 0.3 g. sodium azide in 10 ml. of acetonitrile. No gas was evolved and an emulsion was formed. The reaction mixture was extracted with pentane, dried and the residue purified by thin layer chromatography, as described in Example I and II. Spectral and elemental analysis confirmed the structure shown above.

EXAMPLE IV

Trans-1,2-diphenyl-1-azido-2-nitratoethane

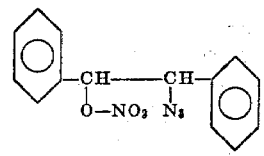

0.5 ml. of water at 75° C. was added to 0.5 g. trans-stilbene (obtained from the J. T. Baker Chemical Company) and 0.2 g. sodium azide in 15 ml. of acetonitrile. Thereafter 0.5 g. CAN in 15 ml. of acetonitrile was added slowly and dropwise with no evolution of gas. After the extraction and purification outlined previously IR and NMR analysis confirmed the presence of the above-identified compound.

In similar procedures, the following compounds of the present invention are prepared:

2-azido-1-(m-chlorophenyl)-1-nitratopropane, molecular weight (M.W.) 256.7
2-azido-3-nitrato-3-(o-bromophenyl)-tridecane, M.W. 441.4
1-azido-2-nitrato-2-(p-fluorophenyl)-dodecane, M.W. 506.7
3-azido-5-methyl-2-nitrato-2-(p-t-butylphenyl)-hexane, M.W. 334.4
6-azido-2,2-dimethyl-7-nitrato-7-(p-methylphenyl)-tridecane, M.W. 404.6
1-azido-1,2-di-(m-isopropylphenyl)-2-nitratoethane, M.W. 368.4
1-azido-1,2-diisopropyl-2-nitratocyclopentane, M.W. 256.3

2-azido-1,4-didecyl-3-nitratocyclohexane, M.W. 466.7
1-azido-4,5-diisopropyl-2-nitratocyclohexane, M.W. 270.3
1-azido-5-neopentyl-2-nitratocycloheptane, M.W. 270.3
1-azido-2-nitratocyclodecane, M.W. 242.3
1-azido-2-nitratocyclododecane, M.W. 270.3
2-azido-1-nitrato-1-t-butylcyclohexane, M.W. 242.3
2-azido-1-decyl-1-nitratocyclohexane, M.W. 326.4
1-azido-2-nitrato-4-phenylcyclopentane, M.W. 248.2
2-azido-1,4-di-(m-chlorophenyl)-3-nitratocyclohexane, M.W. 407.3
1-azido-4,5-di-(o-bromophenyl)-2-nitratocyclohexane, M.W. 496.2
2-azido-1,4-di-(p-fluorophenyl)-3-nitratocyclohexane, M.W. 374.4
1-azido-4-(m-methylphenyl)-2-nitratocyclopentane, M.W. 262.3
2-azido-1,4-di-(m-isopropylphenyl)-3-nitratocyclopentane, M.W. 408.5
2-azido-1,4-di-(m-butylphenyl)-3-nitratocyclopentane, M.W. 436.6
2-azido-1,4-di-(m-t-butylphenyl)-3-nitratocyclohexane, M.W. 450.6

In accordance with the present invention, it has been discovered that the 1,2-azidonitrates can be employed as intermediates in the production of corresponding α-amino-β-hydroxy compounds. The following example will serve as an illustration.

EXAMPLE V 1-azido-2-nitrato-2-phenylethane was prepared in 73% yield by the general procedures described. A quantity of 527 mg. (2.7 mmol) of the azidonitroalkane was added dropwise to a mixture of 630 mg. (11.3 mmol) of iron powder in 14 ml. acetic acid which was being stirred. The stirring was continued for 30 minutes after the addition was complete. Thereafter the iron was removed by filtration and the filtrate was made basic by addition of concentrated sodium hydroxide. The precipitate which resulted upon the addition of the base was removed by filtration and the filtrate was extracted with ether. The ether solution was dried, filtered and the ether removed under reduced pressure. The NMR spectrum of the sample indicated that the 31% yield consisted of α-(aminomethyl)benzyl alcohol. The hydrogen sulfate salt of this amino alcohol is used during polymerization reactions and topically as a vasoconstrictor.

Similarly, other products of the invention can be employed as intermediates in the production of the commercially important amino alcohols and derivatives thereof.

PREPARATION OF STARTING MATERIALS

The ceric ammonium nitrate (CAN) used herein was purchased from the G. Fredrick Smith Chemical Company of Columbus, Ohio. In general, it is prepared using known procedures which treat ceric oxide with nitric acid; a complete description of the synthesis can be found in the book Cerate Oxidimetry, by G. Fredrick Smith at pp. 2–5.

The preparation and literature references regarding sodium azide are given on p. 954 of the Merck Index, 8th edition. The synthesis of the other azides is described in the Handbook of Preparative Inorganic Chemistry, 2nd edition, vol. I, 1965, pp. 474–76. In both cases conventional techniques and well-known procedures are employed As noted previously, the olefins for use in the reactions of the present invention were obtained from commercial sources. Because otfhe state of the chemical art as well as the number of compounds involved, no specific references as to their synthesis is deemed necessary.

What is claimed is:
1. A process of producing 1,2-azidonitrates of the formula

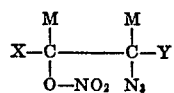

which comprises reacting an olefin of the formula

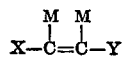

with an ionic azide of the formula $$Z^t(N_3)_t$$

and ceric ammonium nitrate of the formula $$(NH_4)_2{}^{++}[Ce(NO_3)_6{}^=]$$

according to the equation

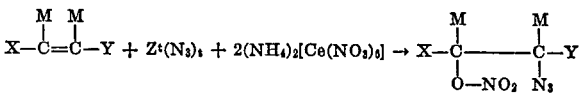

wherein: each X, taken separately, independently represents hydrogen, a primary, secondary or tertiary alkyl of from 1 to 5 carbon atoms, inclusive, or phenyl; Y represents a primary, secondary or tertiary alkyl of 1 to 5 carbon atoms, inclusive, or phenyl; each M, taken separately, independently represents hydrogen or a primary, secondary or tertiary alkyl of 1 to 5 carbon atoms, inclusive; Z represents an ionic cation selected from the group consisting of sodium, potassium, lithium, beryllium and magnesium; and $t$ is an integer from 1 to 2, inclusive.

2. A process of producing 1,2-azidonitrates of the formula

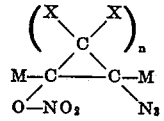

which comprises reacting an olefin of the formula

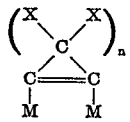

with anionic azide of the formula $$Z^t(N_3)_t$$

and ceric ammonium nitrate of the formula $$(NH_4)_2{}^{++}[Ce(NO_3)_6{}^=]$$

according to the equation

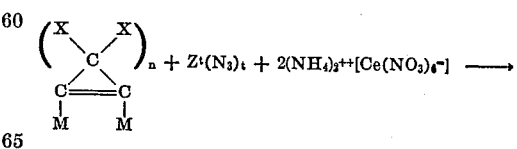

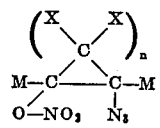

wherein: each X, taken separately, independently represents hydrogen, a primary, secondary or tertiary alkyl of from 1 to 5 carbon atoms, inclusive, or phenyl; each M, taken separately, independently represents hydrogen or a primary, secondary or tertiary alkyl of 1 to 5 carbon atoms, inclusive; $n$ is an integer from 3 to 6 inclusive; Z represents an ionic cation selected from the group consisting of sodium, potassium, lithium, beryllium and magnesium; and $t$ is an integer from 1 to 2, inclusive.

3. 1,2-azidonitrates of the formula

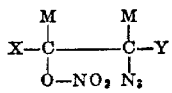

wherein: each X, taken separately, independently represents hydrogen, a primary, secondary or tertiary alkyl of from 1 to 5 carbon atoms, inclusive, or phenyl; Y represenst a primary, secondary or tertiary alkyl of 1 to 5 carbon atoms, inclusive, or phenyl; each M, taken separately, independently represents hydrogen or a primary, secondary or tertiary alkyl of 1 to 5 carbon atoms, inclusive.

4. 1,2-azidonitrates of the formula

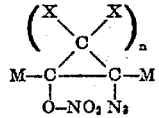

wherein: each X, taken separately, independently represents hydrogen, a primary, secondary or tertiary alkyl of from 1 to 5 carbon atoms, inclusive, or phenyl; each M, taken separately, independently represents hydrogen or a primary, secondary or tertiary alkyl of 1 to 5 carbon atoms, inclusive; $n$ is an integer from 3 to 6, inclusive.

References Cited
UNITED STATES PATENTS 3,153,092   10/1964   Burger _____ 260—349 X JOHN M. FORD, Primary Examiner